H. JACOB & C. VON HOFE.
PRISMATIC DEVICE.
APPLICATION FILED AUG. 6, 1909.
1,086,297.
Patented Feb. 3, 1914.
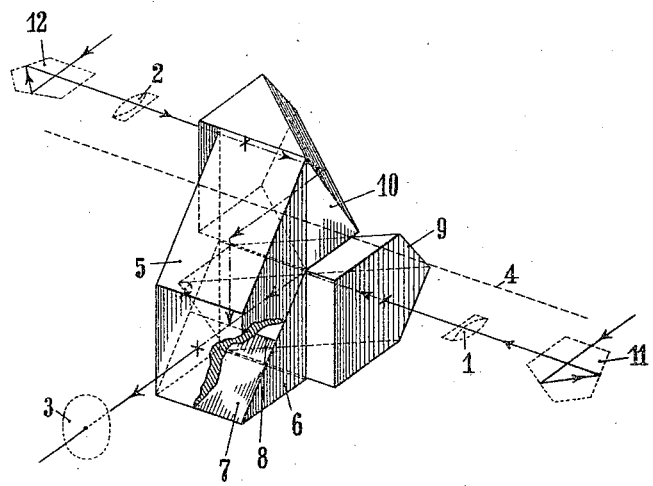

UNITED STATES PATENT OFFICE.

HEINRICH JACOB, OF STEGLITZ, NEAR BERLIN, AND CHRISTIAN VON HOFE, OF WILMERSDORF, NEAR BERLIN, GERMANY, ASSIGNORS TO THE FIRM OF OPTISCHE ANSTALT C. P. GOERZ AKTIENGESELLSCHAFT, OF FRIEDENAU, NEAR BERLIN, GERMANY.

PRISMATIC DEVICE.

1,086,297.  Specification of Letters Patent.  Patented Feb. 3, 1914.

Application filed August 6, 1909. Serial No. 511,512.

*To all whom it may concern:*

Be it known that we, HEINRICH JACOB, a citizen of the German Empire, and resident of Steglitz, near Berlin, Germany, and CHRISTIAN VON HOFE, a citizen of the German Empire, residing at 24 Hildegardstrasse, Wilmersdorf, near Berlin, Germany, have invented certain new and useful Improvements in Prismatic Devices Particularly Adapted for Use in Base-Line Telemeters, of which the following is a specification.

Our invention relates to prismatic devices, particularly adapted to be used in base line telemeters, that is to say to telemeters provided with optical means for obtaining images of objects from the ends of a base line, and with means for adjusting said images with relation to each other and more particularly to those classes of base line telemeters which show the images of the distant objects positioned above and below a horizontal line of division in the field of view of the observer, such telemeters being known as "coincidence" and as "invert" telemeters. The optical means of such instruments comprise an image uniting prism device performing the function of uniting the images produced from the ends of the base line so that same are positioned above and below a line of division as stated.

Now our invention consists in an improved image uniting prism device whereby the line of division in the field of view appears clear and sharp in its whole length.

The improved image uniting prism device herein described comprises two prisms, one of which is a rhombohedral prism, and the other of which has a surface forming a continuation of one of the surfaces of the rhomboid and has another surface contacting with a further surface of the rhomboid, there being between the so-contacting surfaces of the two prisms, a reflecting layer having a sharp limiting edge parallel to the line of demarcation between those surfaces of the rhomboid and second prism, respectively, which are continuations one of the other, the said reflecting layer occupying a portion only of the total area of contact of the two prisms. This sharp limiting edge of the reflecting layer forms, when the prismatic device is used in a base line telemeter, the line of division between the pencils of light coming from the two objectives of that telemeter.

An embodiment of the invention is illustrated on the annexed drawing which shows a telemeter with an image uniting prism device having a line of image division in the field of view arranged in accordance with the invention, said image uniting prism device being in a perspective view whereas the other optical elements of the telemeter are only diagrammatically indicated in dotted lines.

The two objectives of the telemeter are designated 1, 2, the ocular is designated with the reference numeral 3. The base line of the instrument is designated 4 and positioned intermediate the axes of the two objectives which are shown as having the same distances from the base line. The image uniting prism device consists of a rhombohedral prism 5 contacting with a further prism 6 having a polished surface lying in a plane with one of the two surfaces of the rhombohedral prism which intersect the contact surface. The contact surface of the prisms 5, 6 is partly provided with a reflecting layer 7 having a limiting edge 8 forming the line of image division in the field of view.

9 and 10 are two prisms with roof surfaces arranged for throwing the rays coming from the objectives 1, 2 into the prism combination 5, 6.

The usual pentaprisms which reflect the rays coming from the distant object looked at into the objectives are designated 11, 12. The adjusting means of the instrument which may be of any known or convenient kind are not illustrated on the drawing in order to avoid complication.

As clearly illustrated in the drawing the limiting edge 8 of the reflecting layer in the contact surface of the prisms 5, 6 is so arranged that the same is parallel to the plane of the measuring triangle that is to say to the plane of the triangle having its base line coinciding with line 4 between pentaprisms 11, 12 and its point coinciding with the distant object upon which the instrument is directed and that said edge 8 is at the same time at right angles to the axis of the rays penetrating through the prism combination 5, 6. It results from this arrangement that if one point of the said line of division coincides with a common image plane of the two objectives of the instrument at the same time the whole length of said line coincides with said image plane so that the line of division appears absolutely sharp in the field of view.

What we claim is:—

1. A prismatic device comprising two prisms, one surface of one said prism in the same plane with a surface of the other prism, and forming a substantial continuation thereof, said prisms having each another surface angularly related to the first mentioned surface of that prism, the said angularly related surface of the one prism being in contact with the said angularly related surface of the other prism, one of said angularly-related prism surfaces having a reflecting layer covering a portion only of that surface, the limiting edge of such reflecting layer being parallel to the line of demarcation between those surfaces of the prisms which are continuations one of another.

2. A prismatic device comprising a rhombohedral prism and a second prism, one surface of the second prism being in the same plane with a surface of the rhomboid, and forming a continuation thereof, another surface of said second prism being in contact with a surface of the rhombohedral prism which is angularly related to the first mentioned surface of that rhombohedral prism, such angularly related surface of the rhombohedral prism being provided with a reflecting layer covering a portion only of such surface of said rhombohedral prism and having a limiting edge parallel with the line of demarcation between the two surfaces of the said prisms which are continuations of one another.

3. A prismatic device comprising in combination a rhombohedral prism and a second prism, one surface of said second prism being in the same plane with one of the surfaces of the rhombohedral prism, and forming a continuation of such surface, another surface of said second prism being in contact with a surface of such rhombohedral prism which is angularly related to the first mentioned surface of such rhombohedral prism, a reflecting layer being provided between the said contacting surfaces of the two prisms, said reflecting layer covering a portion only of the said contacting surfaces of the two prisms and having a limiting edge parallel to the line of demarcation between the first mentioned surfaces of said prisms.

In testimony whereof we have signed this specification in the presence of two subscribing witnesses.

HEINRICH JACOB.
CHRISTIAN von HOFE.

Witnesses:
HENRY HASPER,
ARTHUR SCHROEDER.